3,304,217
APPARATUS FOR THE PRODUCTION OF WELDED BAGS FROM THERMOPLASTIC TUBULAR SHEETING

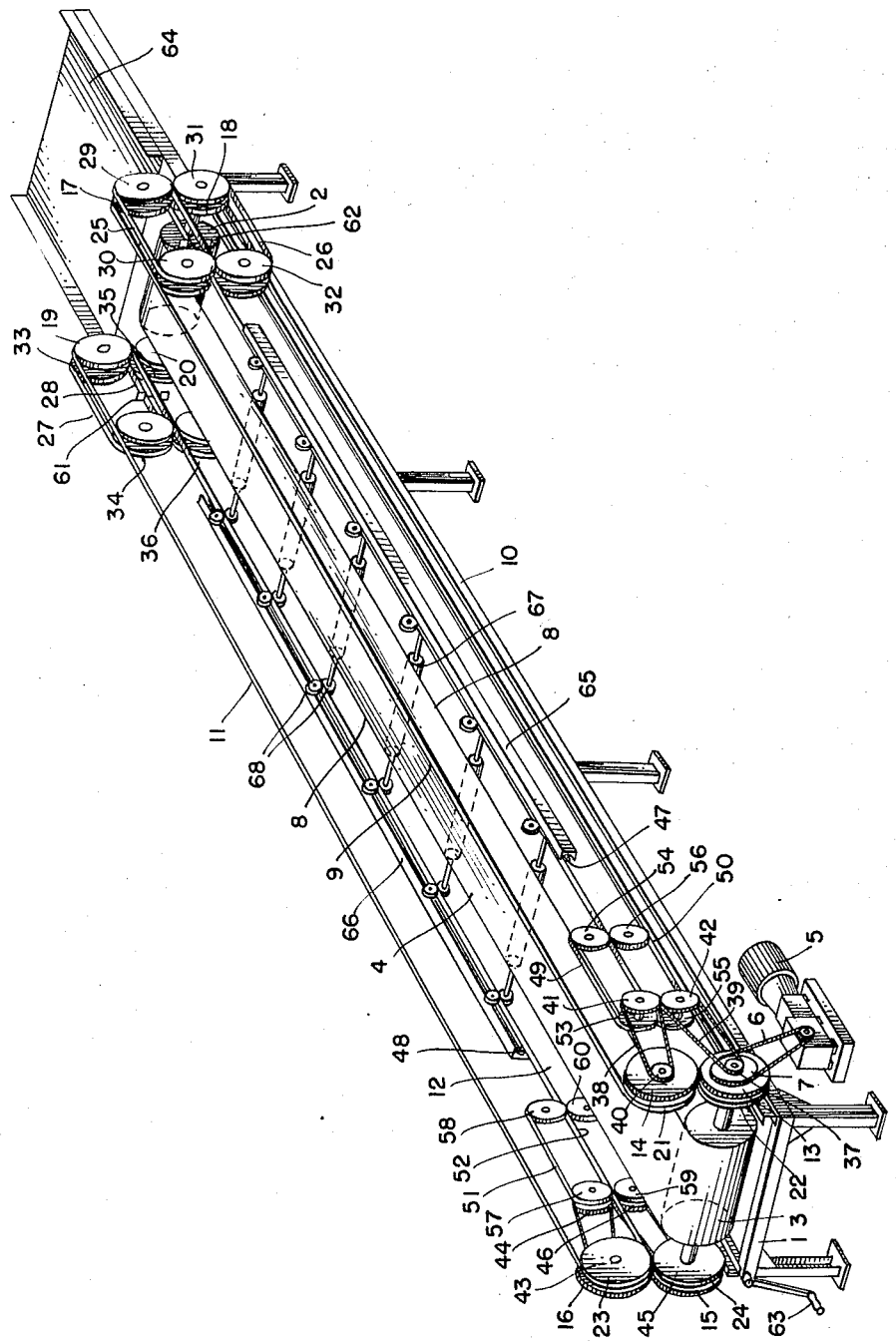

Ernst Mommsen, Mannheim, and Horst Rosewicz and Jakob Schoenmann, Ludwigshafen (Rhine), Germany, assignors to Badische Anilin- & Soda-Fabrik Aktiengesellschaft, Ludwigshafen (Rhine), Germany
Filed Dec. 4, 1963, Ser. No. 328,030
Claims priority, application Germany, Dec. 5, 1962, B 69,867
5 Claims. (Cl. 156—499)

This invention relates to a apparatus for the production of plastic bags. The invention relates more specifically to an apparatus for the production of bags from tubular thermoplastic sheeting.

Bags of this type are prepared by a conventional method in which tubular sheeting is cut into suitable lengths and the opposite walls of these lengths are welded, or heat-sealed along their cut edges.

When these bags are full, they have the shape of a cushion. It is a disadvantage of this shape of bag that for a given bulk density and a given size of pallet, dimensions which are in keeping with the size of the pallet cannot always be achieved. The height may be varied only by varying the degree of filling, but for the same degree of filling it is positively determined so that it cannot be varied once the measurement has been fixed.

Moreover there is a difference in length between the diameter of the circular cross-section of a filled tubular sheeting and the straight welded seams at its ends, so that the corners project beyond the edges of the bag and are particularly susceptible to mechanical damage. The service life of the bag is thus shortened.

Another disadvantage of the cushion-shaped bag is the curved outer surface. When the bag is in a horizontal position, the two walls of the bag are parallel in the middle, but slope downwardly or upwardly towards the top, bottom and side edges. When stacked, the bags therefore lie on one another with only part of their outer surface and easily slip. Attempts have therefore been made to make bags having a boxlike shape.

One prior art method for making such bags consists in providing the tubular section with two folds turned inwardly in the longitudinal direction. The folds in the welded joint are fixed after the top and bottom of the sack have been closed. A so-called side fold bag is thus formed. During filling, a substantially boxlike bag forms which lies flat on adjacent bags in a stack by means of the bulk of its outer surface so that the frictional surface and the slip resistance are both increased.

It is difficult to close tubular bags of this shape at the two open ends by welding because there are a varying number of plies along the welding seam. In continuous welding in a single operation, this necessitates varying amounts of heat per unit length of the seam in order to achieve uniform welding of the individual plies and a seam of uniform width. The amount of heat which can be supplied by the conventional closure equipment can however only be adjusted uniformly over the length of the seam, i.e. they allow for either the minimum or maximum number of plies. Tubular bags of this type have therefore hitherto been closed by sewing machines, i.e. they have been sewn.

This method of closure is however expensive owing to the cost of material and is also unreliable because, in contrast to a welded seam, the parts of the sheeting which have been perforated by sewing may tear, especially at the top and bottom where increased stress occurs at deep folds.

The necessity of welding, in one operation, seams having a different number of plies also arises in making valve bags from tubular sheeting. After a suitable length has been cut, a double-walled portion of sheeting projecting over the upper cut edge is tucked in so that these two plies lie between the two walls of the sack. In this way there are also formed four plies for a distance corresponding to the length of the valve whereas for the remaining length of the top seam only two plies of sheeting have to be welded together.

The general object of the invention is to provide a new process for the economic production of welded bags from thermoplastic tubular sheeting.

Another object of the invention is to provide a process for automatically and continuously welding valve bags at both ends after they have been provided with a valve.

We have now found that welded bags of thermoplastic tubular sheeting having side folds and a valve may be made continuously by cutting from the tubular sheeting individual sections, providing the sections, laid flat, with side folds and a valve in a conventional way and at the same time cutting them at the top and bottom ends with pressure acting on both sides near the ends and with the formation of cut surfaces which penetrate all the folds, heating the cut surface at the two front edges by radiation, melting them and welding them to a thickened seam, keeping the seams under pressure until they are cold and discharging the welded bags.

In this way it is possible, by a single passage of a bag through the welding equipment, to weld simultaneously plies superposed in different numbers and to achieve welded seams having uniform strength.

Heat is radiated to the cut surfaces in the direction of extrusion of the sheeting, so that they act as absorption surfaces, the orientation stress of the sheeting causes a shrinkage whereby the edges of the plies are drawn together during welding with the formation of a reinforced seam which is bead-shaped in cross-section. The seam thus reinforced is shaped while hot. The sheeting used for welding is sheeting during whose preparation orientation stresses have been produced by preferential stretching in the direction of extrusion.

Apparatus for carrying out the process comprises a horizontal frame, a motor-driven endless elastic belt running over two terminal drums horizontal relative to each other and serving to receive individual flat sections of sheeting which project beyond both edges of the belt, four long cooled endless steel strips running horizontally in the same direction as the elastic belt and in the plane of the upper flight of the belt and arranged in pairs on both sides of the belt, the middle flights of the pairs of strips being pressed together and travelling at the same speed as the belt, a source of radiant heat, preferably electrical, mounted near to each pair of steel strips, and a pair of short cooled endless steel strips pressed together and arranged upstream and downstream of the source of radiant heat in the direction of movement of the belt, parallel to and spaced from the said pairs of long endless steel strips on each side of the belt.

For the uniform cutting of the two ends of the respective section a vertical steel blade rotating at high speed is provided at the front end of the apparatus perpendicularly to the plane of the two pressed-together flights of the pair of long steel strips between the middle flights of the long and short steel strips.

The deflecting rollers of the pairs of long and short steel strips are provided with shafts mounted at their ends in the frame and prolonged with respect to the width of the rollers and with manually operable spreading levers rotatably mounted in the frame, for moving the strips apart horizontally.

The apparatus required for carrying out the process is illustrated in perspective in the accompanying drawings.

Referring to the drawing, an elastic belt 4 runs over a front terminal drum 2 at the front end of a frame 1 and over a rear terminal drum 3. This belt serves to convey sections of tubular sheeting provided with a valve and two side folds. The elastic belt 4 is driven by a variable motor 5, for example through a chain 6, gear wheel 7 and the rear terminal drum 3.

Two pairs of long steel strips 9 and 10, and 11 and 12, are arranged with their middle flights pressed together at a distance from the outer edges 8 of the upper flight of the belt 4. The lower flight of the upper steel strip 9 (or 11) and the upper flight of the lower steel strip 10 (or 12) are pressed together in the plane of the upper flight of the elastic belt 4. The steel strips 9 to 12 are driven through gear wheels 13 to 16 at the same time as the rear terminal drum 3 and are passed round rollers 17 to 20 at the front end of the apparatus and over rollers 21 to 24 at the rear end.

Four short steel strips are arranged parallel to the long steel strips 9 to 12 in the same plane, but farther away from the latter, at the front end of the frame 1. These run over deflecting rollers 29 to 36 and have their middle flights pressed together in pairs in the plane of the upper flight of the belt 4, namely steel strip 25 with 26 and steel strip 27 with 28. The short steel strips are also driven by the motor 5, for example through a small gear wheel 37 connected with the gear wheel 13, chains 38 and 39 and gear wheels 40 to 46. At each side near the upper edge of the belt 4 a source of heat 47 or 48 is provided. Heat radiation therefrom is directed by concave mirrors 65 and 66.

The long steel strips are cooled by suitable means, for example spring-loaded jaws (not shown) through which water flows.

Short steel strips 49 to 52 pressed together in pairs and cooled are arranged for pressing the welded seam at the rear end of the apparatus in the same way as at the front end. They run over deflecting rollers 53 to 60.

A cutter, for example a rotating blade or an electrically heated wire 61 (62), is provided at the front end of the apparatus to cut the sections of sheeting; this is arranged between the long and short steel strips on each side of the belt. All the deflecting rollers 17 to 24, 29 to 36 and 35 to 60 may be moved in a horizontal direction simultaneously and uniformly perpendicularly to the outer edges 8 of the upper flight of the belt 4 by means of a crank 63 and a number of spreading levers (not shown) provided beneath the belt. The long steel strips 9 to 12 and the short steel strips 25 to 28 and 49 to 52 carry out the same movement. In this way it is possible to weld sections of sheeting of different lengths and to adapt the position of the steel strips to the position of the seam. A table 64 at the front end of the apparatus serves for feeding the sections of sheeting.

To facilitate the exchange of the heating means, the apparatus is so designed that the two upper steel strips 9 and 11, including deflecting rollers, cooling jaws and guide rollers, can be hinged downwardly to the right and left (this is not shown in the drawing).

The apparatus for the production of bags operates in the following manner. A section of sheeting roughly cut at both ends and fed onto the table 64 passes into the feed zone of the long steel strips 9 to 12 on the surface of the upper flight of the belt 4. It is gripped by the steel strips 9 to 12 near to the cut edges so that a small strip of predetermined width projects on each side over the outer edges of the steel bands 9 and 10, and 11 and 12, respectively.

The uniform thickness of the seam depends on the uniform width of the projecting strips. The portions of the sheeting sections which are in excess of the desired width are cut off with the cutting means. In this way, both at the top and bottom ends of the bag, a strip of uniform width projects over the edge of the steel strip.

The cutting means may consist for example of an electrically heated incandescent wire or a rotating steel blade 61 (or 62) which is provided on each side of the belt 4 at the desired distance from the edges of the steel strips 9 to 12 and between these and the short steel strips 25 to 28. The two pairs of short steel strips (25 and 26, 27 and 28) which lie outside the long steep strips, serve the purpose of holding taut, during the cutting operation, the sheeting section which is to be cut at both edges.

The deflecting rollers for the long steel strips which run the full length of the machine are made sufficiently wide at the front end of the apparatus to accommodate the steel strips 25 to 28 also. These endless short steel strips 25 to 28 are passed over deflecting rollers 30, 32, 34 and 36, arranged at a short distance from the deflecting rollers 29, 31, 33 and 35 so that behind the incandescent wires 61, 62 in the direction of conveyance, the pairs of short steel strips (25 and 26, 27 and 28) are turned at a short distance by these additional deflecting rollers 30, 32, 34 and 36. In this way the strips of sheeting cut off are laid down on both sides. A correcting cut is not necessary if the top and bottom opening to be welded has been accurately cut and the section has been fed in uniformly and in alignment with the feed table.

The two pairs of long steel strips (9 and 10, 11 and 12) which run over spring-mounted cooling jaws (not shown) now pass with their exposed strips the heat source 47, 48 of adequate length, for example an electrically heated spiral, of which the heat radiation is directed perpendicularly onto the cut edges of the sheeting section by concave reflectors 65, 66. The temperature must be controlled so that oxidation phenomena and combustion are avoided but an optimum strength of the welded seam achieved. The residence period within the range of the concave reflectors 65, 66 is dependent on the coefficient of thermal conductivity of the plastic and the thickness of the sheeting and for a given speed is determined by the length of the heat sources. This length is about 4 metres for example when using polyethylene sheeting which is 0.3 mm. in thickness and a speed of 13 metres per minute. During passage along the concave reflectors, the plastic melts inwards from the cut edges and contracts in the direction of extrusion. A thickened seam of bead-shaped cross section is thus formed. This is then gripped by the four revolving, cooled, spring-urged, short steel strips 49 to 52 so that the bead seam is shaped and cooled under the pressure of the cooled strips. It has been found by experience that cooling under pressure is a condition for adequate strength and durability of the seam. The welded bag is discharged after it has passed the rear terminal drum 3.

To prevent sagging of the upper flight of the belt 4 and of the pressed-together flights of the long steel strips 9 to 12, a plurality of support rollers 67 and small lateral rollers 68 are rotatably mounted in the frame 1. The rollers 68 can be moved apart together with the deflecting rollers by turning the crank 63.

We claim:

1. Apparatus for the continuous production of welded bags from thermoplastic tubular sheeting having lateral folds and a valve, comprising a generally horizontal frame, a motor-driven endless elastic belt running over two terminal drums horizontal relative to each other and serving to receive individual flat sections of sheeting, such sections of sheeting projecting beyond both edges of said belt, four long cooled endless steel strips spaced from the two sides of said belt and traveling horizontally in pairs in the plane of the upper flight of said belt in the same direction as said belt, the middle flights of said endless strips being pressed together and traveling at the same rate as said belt, a source of radiant heat located adjacent to each of said pairs of endless steel strips, and a pair of short cooled endless steel strips pressed together and located upstream and downstream of said source of radiant heat in the direction of movement of said belt, parallel to and spaced from said pairs of long endless steel strips on both sides of said belt.

2. Apparatus as set forth in claim 1 comprising cutting means arranged between the middle flights of said long and short steel strips, perpendicularly to the plane of the pressed-together flights of said long steel strips.

3. Apparatus as set forth in claim 1 wherein the cutting means includes a perpendicular blade rotating at high speed.

4. Apparatus as set forth in claim 1 wherein the cutting means includes an electrically heated incandescent wire.

5. Apparatus as set forth in claim 1 wherein the deflecting rollers for said pairs of steel strips are mounted on shafts in said frame and are capable of being moved apart horizontally with respect to the width of said deflecting rollers by manually operable spreading levers rotatably mounted on said frame.

References Cited by the Examiner

UNITED STATES PATENTS

| | | | |
|---|---|---|---|
| 2,606,850 | 8/1952 | Piazze | 156—499 |
| 2,679,469 | 5/1954 | Bedford | 156—272 |
| 2,691,474 | 10/1954 | Olson | 156—499 |
| 2,749,020 | 6/1956 | Baxter | 156—499 |
| 2,979,113 | 4/1961 | Stageberg | 156—499 |
| 3,243,330 | 3/1966 | Zelnick | 156—499 |

EARL M. BERGERT, *Primary Examiner.*

DOUGLAS J. DRUMMOND, *Examiner.*